(12) United States Patent
Gava et al.

(10) Patent No.: US 7,752,305 B2
(45) Date of Patent: Jul. 6, 2010

(54) SYSTEM AND METHOD FOR DESCRIPTOR-BASED DISCOVERY OF NETWORK DOCUMENT PROCESSING DEVICES

(75) Inventors: Fabio Gava, Ladera Ranch, CA (US);
Andrey Savov, Fullerton, CA (US);
Silvy Wilson, Rancho Santa Margarita, CA (US)

(73) Assignees: Kabushiki Kaisha Toshiba (JP);
Toshiba Tec Kabushiki Kaisha (JP)

( * ) Notice: Subject to any disclaimer, the term of this patent is extended or adjusted under 35 U.S.C. 154(b) by 613 days.

(21) Appl. No.: 11/626,823

(22) Filed: Jan. 24, 2007

(65) Prior Publication Data
US 2008/0177876 A1 Jul. 24, 2008

(51) Int. Cl.
*G06F 15/16* (2006.01)
*G06F 15/173* (2006.01)

(52) U.S. Cl. ................. 709/224; 709/226; 709/228; 709/227; 709/238; 709/217; 709/236

(58) Field of Classification Search ................ 709/227, 709/223, 224, 206, 236, 228, 238
See application file for complete search history.

(56) References Cited

U.S. PATENT DOCUMENTS

2005/0044197 A1 * 2/2005 Lai .......................... 709/223
2005/0232209 A1 * 10/2005 Buckley et al. ............. 370/338

* cited by examiner

*Primary Examiner*—Jude J Jean Gilles
(74) *Attorney, Agent, or Firm*—Tucker Ellis & West

(57) ABSTRACT

The subject application is directed to a network document processing device discovery system and method. Multicast address data and local identification data are first stored in an associated storage. A probe message is then received from an associated processing device via an associated network. The probe message corresponds to stored multicast address data. Probe identification data associated with the probe message is then tested with the local identification data. Device data, representing a capability of a document processing device, is then selectively communicated to the processing device according to an output of the testing.

15 Claims, 7 Drawing Sheets

SYSTEM AND METHOD FOR DESCRIPTOR-BASED DISCOVERY OF NETWORK DOCUMENT PROCESSING DEVICES

BACKGROUND OF THE INVENTION

The subject application is directed to a system and method for discovery of network document processing devices. In particular, the subject application is directed to a system and method which allows for the discovery of document processing device functions on a network using standard implementations of Universal Description, Discovery and Integration (UDDI) technical models (tModels).

OASIS (Organization for the Advancement of Structured Information Standards) is an international consortium that supports development, convergence, and adoption of e-business standards. Within OASIS is an effort leading to development of the UDDI protocol, which is a web services building block. UDDI creates an interoperable platform that allows one to quickly, easily, and dynamically find and use Web services over the Internet. UDDI also allows operational registries to be maintained for different purposes in different contexts. UDDI is a cross-industry effort within the OASIS standards consortium.

The UDDI project takes advantage of World Wide Web Consortium (W3C) and Internet Engineering Task Force (IETF) standards such as Extensible Markup Language (XML), and HTTP and Domain Name System (DNS) protocols. Additionally, cross platform programming features are addressed by adopting early versions of the proposed Simple Object Access Protocol (SOAP) known as XML Protocol messaging specifications.

Current UDDI specifications define: SOAP application program interfaces ("APIs") that applications use to query and to publish information to a UDDI registry; XML Schema schemata of the registry data model and the SOAP message formats; Web Service Definition Language ("WSDL") definitions of the SOAP APIs; and UDDI registry definitions (technical models—tModels) of various identifier and category systems that may be used to identify and categorize UDDI registrations.

tModels are core components of UDDI. tModels represent unique concepts or constructs and are used to describe compliance with a specification, a concept, a category or identifier system, or a shared design. Each tModel suitably contains an overview URL, which references a document that describes the tModel and its use in more detail. Specification tModels are used to represent service type definitions, that is, reusable features of Web services. Web service registrations reference specification tModels in order to indicate their compliance with the service type definition. Category systems and identifier systems tModels, together known as "value sets" enable the categorization and identification of entities registered in UDDI in accordance to these value sets. This provides an ability to attribute metadata to providers and services registered in UDDI, and then run queries based on that metadata.

SUMMARY OF THE INVENTION

In accordance with one embodiment of the subject application, there is provided a system and method for discovery of network document processing devices.

In accordance with one embodiment of the subject application, there is provided a system and method which allows for the discovery of document processing device functions on a network using standard implementations of UDDI tModels.

Further, in accordance with one embodiment of the subject application, there is provided a network document processing device discovery system. The system includes storage means adapted for storing multicast address data and local identification data and means adapted for receiving, from an associated network, a probe message from an associated processing device, which probe message corresponds to stored multicast address data. The system further includes testing means adapted for testing probe identification data associated with the probe message with the local identification data and means adapted for selectively communicating device data representative of a capability of a document processing device to the associated processing device in accordance with an output of the testing means.

In another embodiment of the subject application, the probe identification data and the local identification data include a UUID corresponding to a selected capability of the document processing device. In yet another embodiment of the subject application, probe identification data and local identification data further include tModel data representative of a tModel associated with a the UUID. Preferably, in one embodiment of the subject application, the tModel data is obtained from a local UDDI registry. Preferably, in another embodiment of the subject application, the tModel data is obtained from a global UDDI registry.

In yet another embodiment of the subject application, the device data includes data representative of a match of the probe message and data disposed in the storage means.

Still further, in accordance with one embodiment of the subject application, there is provided a method for network processing device discovery in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for discovery of network document processing devices. In particular, the subject application is directed to a system and method which allows for the discovery of document processing device functions on a network using standard implementations of UDDI tModels. It will become apparent to those skilled in the art that the system and method described herein are suitably adapted to a plurality of varying electronic fields employing user interfaces, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
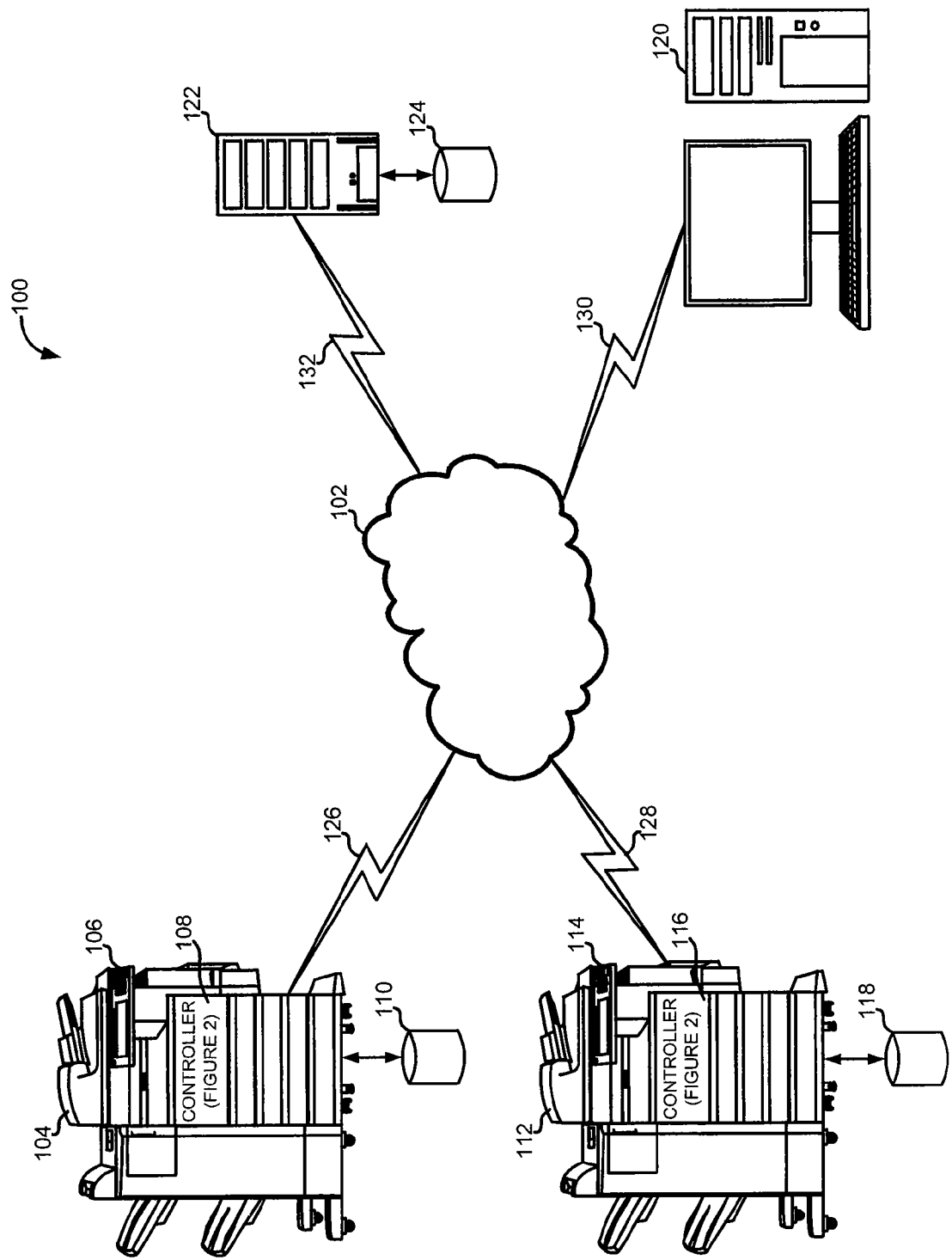
FIG. 1 is an overall diagram of the network document processing device discovery system according to the subject application.

Referring now to FIG. 1, there is shown an overall diagram of the discovery of network document processing devices system 100 in accordance with the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a first document processing device 104, and a second document processing device 112, depicted in FIG. 1 as multifunction peripheral devices, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, each document processing device 104 and 112 is suitably adapted to provide remote document processing services to external or network devices. Preferably, the first document processing device 104 and the second document processing device 112 include hardware, software, and any suitable combination thereof, configured to interact with an associated user, a networked device, or the like. It will be understood by those skilled in the art that the use of two document processing devices is for illustration purposes only, and the subject application is capable of implementation using any number of document processing devices in accordance therewith.

According to one embodiment of the subject application, each document processing device 104 and 112 is suitably equipped to receive a plurality of portable storage media, including, without limitation, Firewire drive, USB drive, SD, MMC, XD, Compact Flash, Memory Stick, and the like. In the preferred embodiment of the subject application, the document processing devices 104 and 112 further include associated user interfaces 106 and 114, respectively, such as a touch-screen, LCD display, touch-panel, alpha-numeric keypad, or the like, via which an associated user is able to interact directly with the corresponding document processing device 104 or 112. In accordance with the preferred embodiment of the subject application, the user interfaces 106 and 114 are advantageously used to communicate information to the associated user and receive selections from the associated user. The skilled artisan will appreciate that the user interfaces 106 and 114 comprise various components, suitably adapted to present data to the associated user, as are known in the art. In accordance with one embodiment of the subject application, the user interfaces 106 and 114 comprise a display, suitably adapted to display one or more graphical elements, text data, images, or the like, to an associated user, receive input from the associated user, and communicate the same to a backend component, such as a controller 108 or 116, respectively, as explained in greater detail below. Preferably, each document processing device 104 and 112 is communicatively coupled to the computer network 102 via a suitable communications link 126 and 128, respectively. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with the subject application, each document processing device 104 and 112 further incorporates a backend component, designated as the controllers 108 and 116, suitably adapted to facilitate the operations of the corresponding document processing device 104 and 112, as will be understood by those skilled in the art. Preferably, the controllers 108 and 116 are embodied as hardware, software, or any suitable combination thereof, configured to control the operations of the associated document processing device 104 and 112, facilitate the display of images via the user interfaces 106 and 114, direct the manipulation of electronic image data, and the like. For purposes of explanation, the controllers 108 and 116 are used to refer to any myriad of components associated with the document processing devices 104 and 112, including hardware, software, or combinations thereof, functioning to perform, cause to be performed, control, or otherwise direct the methodologies described hereinafter. It will be understood by those skilled in the art that the methodologies described with respect to the controllers 108 and 116 are capable of being performed by any general purpose computing system, known in the art, and thus the controllers 108 and 116 are representative of such a general computing device and are intended as such when used hereinafter. Furthermore, the use of the controllers 108 and 116 hereinafter is for the example embodiment only, and other embodiments, which will be apparent to one skilled in the art, are capable of employing the system and method for previewing document processing media of the subject application. The functioning of the controllers 108 and 116 will better be understood in conjunction with the block diagrams illustrated in FIGS. 2 and 3, explained in greater detail below.

Communicatively coupled to the document processing devices 104 and 112 are data storage devices 110 and 118. In accordance with the preferred embodiment of the subject application, the data storage devices 110 and 118 are any mass storage devices known in the art including, for example and without limitation, magnetic storage drives, a hard disk drive, optical storage devices, flash memory devices, or any suitable combination thereof. In the preferred embodiment, the data storage devices 110 and 118 are suitably adapted to store a document data, image data, electronic database data, or the like. It will be appreciated by those skilled in the art that while illustrated in FIG. 1 as being a separate component of the system 100, the data storage devices 110 and 118 are capable of being implemented as internal storage component of the document processing devices 104 and 112, a component of the controllers 108 and 116, or the like, such as, for example and without limitation, an internal hard disk drive, or the like. In accordance with one embodiment of the subject application, the data storage device 110 and 118 include multicast address data, local identification data, or the like associated with the corresponding document processing device 104 or 112. Thus, the skilled artisan will appreciate that the data storage devices 110 and 118 are suitably capable of functioning as local UDDI registries.

The system 100 illustrated in FIG. 1 further depicts a processing device 120, in data communication with the computer network 102 via a communications link 130. It will be appreciated by those skilled in the art that the processing device 120 is shown in FIG. 1 as a desktop computer for illustration purposes only. As will be understood by those skilled in the art, the processing device 120 is representative of any electronic processing device known in the art, including, for example and without limitation, a computer workstation, a laptop computer, a personal data assistant, a web-enabled cellular telephone, a smart phone, a proprietary network device, or other web-enabled electronic device. The communications link 130 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the processing device 120 is suitably adapted to generate and transmit electronic documents, document processing instructions, user interface modifications, upgrades, updates, personalization data, or the like, to the document processing device 104, the document processing device 112, or any other similar device coupled to the computer network 102. The functioning of the processing device 120 is more fully explained in detail below with respect to FIG. 4

The system 100 illustrated in FIG. 1 further includes a registry device, shown as the registry server 122, communicatively coupled to the computer network 102 and adapted to provide registration services to processing devices corresponding to web services over the computer network 102. Preferably, the registry server 122 is in data communication with the computer network 102 via a communications link 132. As will be understood by those skilled in the art, the communications link 132 is Bluetooth, WiMax, a proprietary communications network, infrared, optical, the public switched telephone network, 802.11a, 802.11b, 802.11g, 802.11(x), or any other suitable wired or wireless data transmission communications known in the art. The functioning of the registry server 122 is more fully explained in detail below with respect to FIG. 5.

Communicatively coupled to the registry server 122 is a data storage device 124. In accordance with the preferred embodiment of the subject application, the data storage device 124 is any mass storage device known in the art including, for example and without limitation, magnetic storage drives, a hard disk drive, optical storage devices, flash memory devices, or any suitable combination thereof. In the preferred embodiment, the data storage device 124 is suitably adapted to store web service registration data, address data, and the like. It will be appreciated by those skilled in the art that while illustrated in FIG. 1 as being a separate component of the system 100, the data storage device 124 is capable of being implemented as internal storage component of the server 122, or the like, such as, for example and without limitation, an internal hard disk drive, or the like. In accordance with one embodiment of the subject application, the data storage device 124 includes an electronic database containing registration information, including, for example and without limitation, local address data, global address data, tModel data, universally unique identifier ("UUID") data, device data, user data, service data, or the like. Thus, the skilled artisan will appreciate that the registry data storage device 124 is suitably capable of functioning as a global UDDI registry, a local UDDI registry, or a suitable combination thereof.

Figure 2:
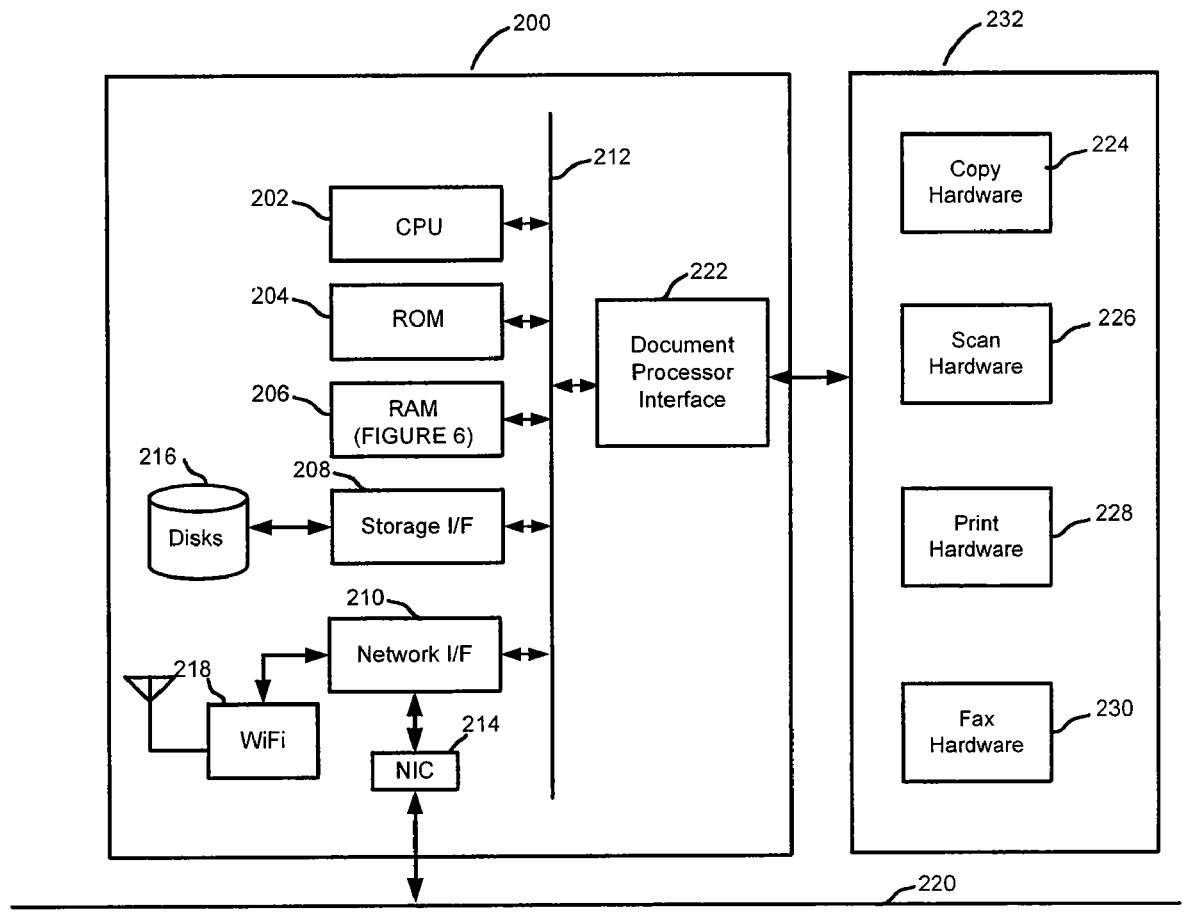
FIG. 2 is a block diagram illustrating controller hardware for use in the network document processing device discovery system according to the subject application.

Turning now to FIG. 2, illustrated is a representative architecture of a suitable backend component, i.e., the controller 200, shown in FIG. 1 as the controllers 108 and 116, on which operations of the subject system 100 are completed. The skilled artisan will understand that the controllers 108 and 116 are representative of any general computing device, known in the art, capable of facilitating the methodologies described herein. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by the processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the controller 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
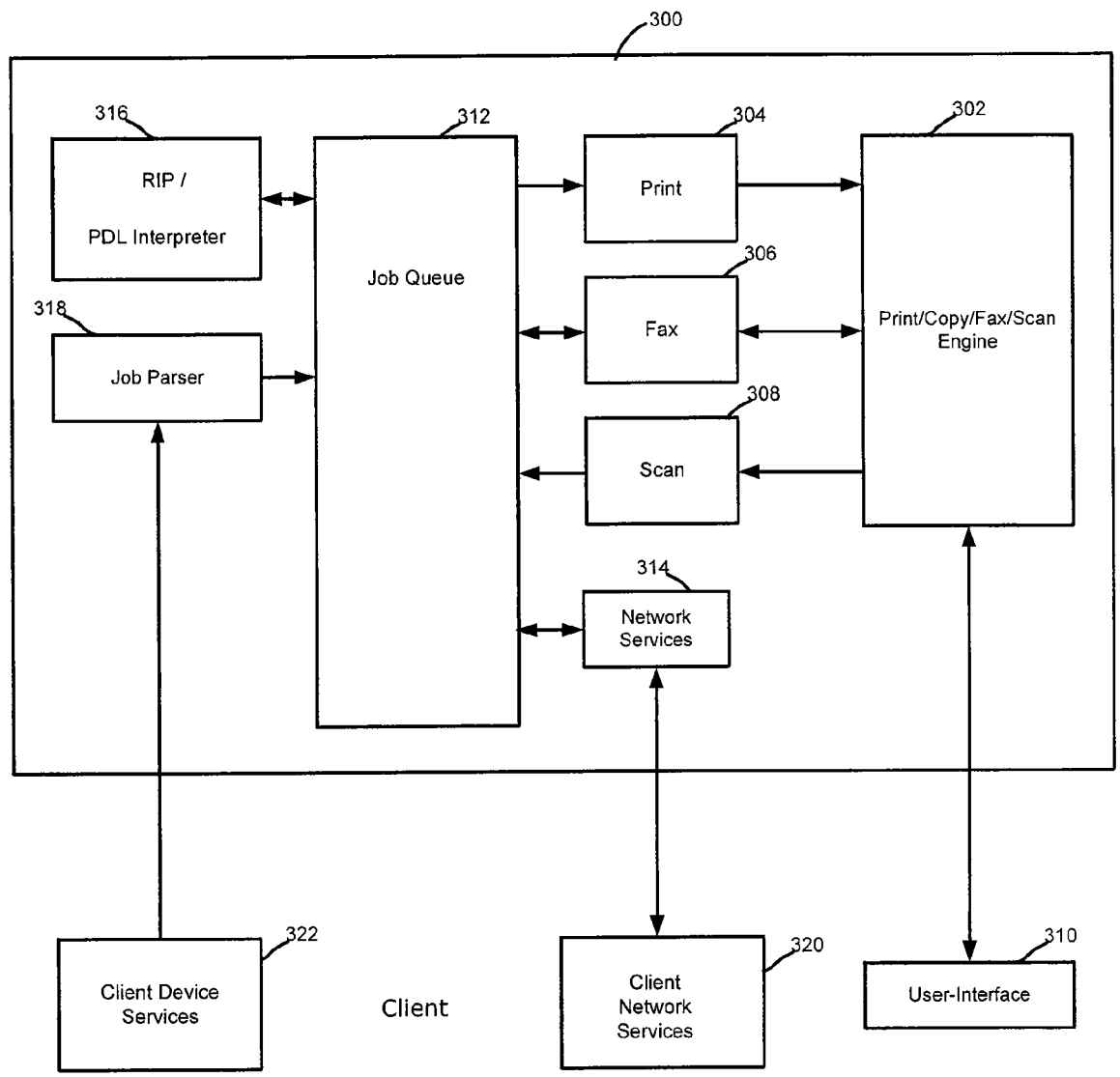
FIG. 3 is a functional diagram illustrating the controller for use in the network document processing device discovery system according to the subject application.

Functionality of the subject system 100 is accomplished on a suitable document processing device, such as the document processing devices 104 and 112, which include the controller 200 of FIG. 2, (shown in FIG. 1 as the controller 108 and the controller 116, respectively) as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image processor, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

Figure 4:
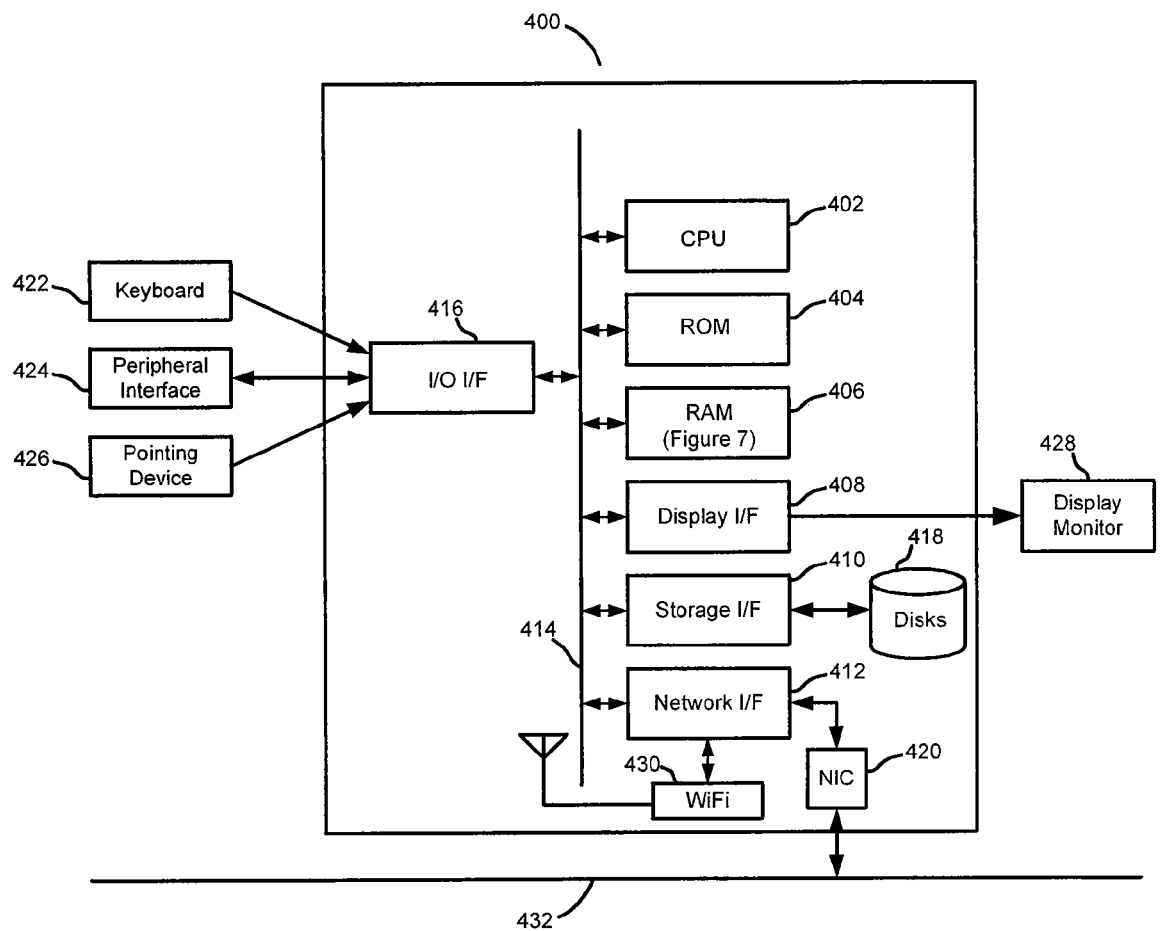
FIG. 4 is a diagram illustrating a processing device for use in the network document processing device discovery system according to the subject application.

Turning now to FIG. 4, illustrated is a hardware diagram of a suitable processing device 400 for use in connection with the subject system. A suitable processing device includes a processor unit 402, suitably comprised of a central processing unit (CPU), which is advantageously placed in data communication with read only memory 404, suitably being non-volatile read only memory, volatile read only memory or a combination thereof, random access memory 406, display interface 408, storage interface 410, and network interface 412. In a preferred embodiment, interface to the foregoing modules is suitably accomplished via a bus 414.

The read only memory 404 suitably includes firmware, such as static data or fixed instructions, such as BIOS, system functions, configuration data, and other routines used for operation of the processing device 400 via CPU 402.

The random access memory 406 provides a storage area for data and instructions associated with applications and data handling accomplished by the processor 402.

The display interface 408 receives data or instructions from other components on the bus 414, which data is specific to generating a display to facilitate a user interface. The display interface 408 suitably provides output to a display monitor 428, suitably a video display device such as a monitor, LCD, plasma, or any other suitable visual output device as will be appreciated by one of ordinary skill in the art.

The storage interface 410 suitably provides a mechanism for non-volatile, bulk or long term storage of data or instructions in the processing device 400. The storage interface 410 suitably uses a storage mechanism, such as storage 418, suitably comprised of a disk, tape, CD, DVD, or other relatively higher capacity addressable or serial storage medium.

The network interface 412 suitably communicates to at least one other network interface, shown as network interface 420, such as a network interface card, and wireless network interface 430, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by on of ordinary skill in the art. In the illustration, the network interface 420 is interconnected for data interchange via a physical network 432, suitably comprised of a local area network, wide area network, or a combination thereof.

An input/output interface 416 in data communication with the bus 414 is suitably connected with an input device 422, such as a keyboard or the like. The input/output interface 416 also suitably provides data output to a peripheral interface 424, such as a USB, universal serial bus output, SCSI, Firewire (IEEE 1394) output, or any other interface as may be appropriate for a selected application. Finally, the input/output interface 416 is suitably in data communication with a pointing device interface 426 for connection with devices, such as a mouse, light pen, touch screen, or the like.

Figure 5:
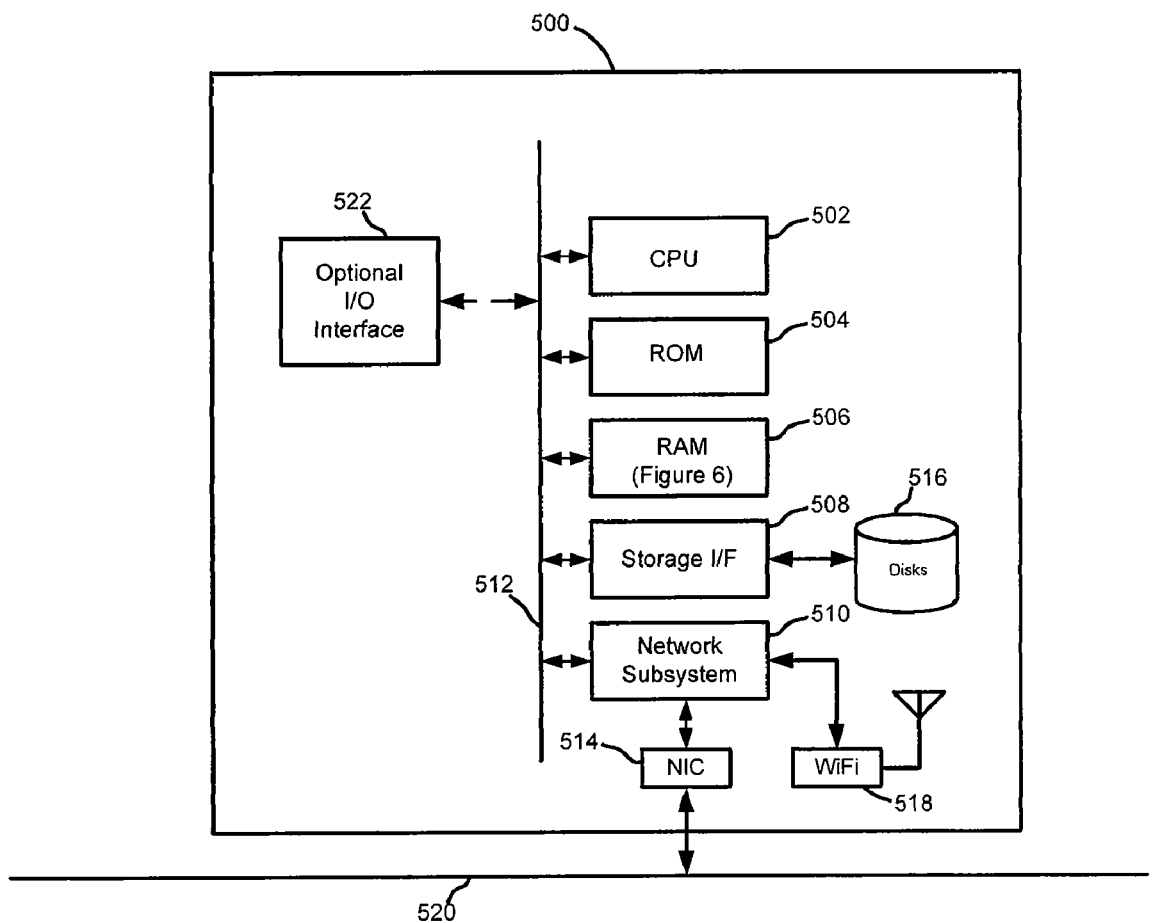
FIG. 5 is a diagram illustrating a server for use in the network document processing device discovery system according to the subject application.

Turning now to FIG. 5, illustrated is a representative architecture of a suitable server 500 on which operations of the subject system are completed. Included is a processor 502, suitably comprised of a central processor unit. However, it will be appreciated that processor 502 may advantageously be composed of multiple processors working in concert with one another as will be appreciated by one of ordinary skill in the art. Also included is a non-volatile or read only memory 504 which is advantageously used for static or fixed data or instructions, such as BIOS functions, system functions, system configuration, and other routines or data used for operation of the server 500.

Also included in the server 500 is random access memory 506, suitably formed of dynamic random access memory, static random access memory, or any other suitable, addressable memory system. Random access memory provides a storage area for data instructions associated with applications and data handling accomplished by the processor 502.

A storage interface 508 suitably provides a mechanism for volatile, bulk or long term storage of data associated with the server 500. The storage interface 508 suitably uses bulk storage, such as any suitable addressable or serial storage, such as a disk, optical, tape drive and the like as shown as 516, as well as any suitable storage medium as will be appreciated by one of ordinary skill in the art.

A network interface subsystem 510 suitably routes input and output from an associated network allowing the server 500 to communicate to other devices. The network interface subsystem 510 suitably interfaces with one or more connections with external devices to the server 500. By way of example, illustrated is at least one network interface card 514 for data communication with fixed or wired networks, such as Ethernet, token ring, and the like, and a wireless interface 518, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 514 is interconnected for data interchange via a physical network 520, suitably comprised of a local area network, wide area network, or a combination thereof.

Data communication between the processor 502, read only memory 504, random access memory 506, storage interface 508 and the network subsystem 510 is suitably accomplished via a bus data transfer mechanism, such as illustrated by bus 512.

Suitable executable instructions on the server 500 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 522 as will be appreciated by one of ordinary skill in the art.

In operation, multicast address data and local identification data are first stored in an associated storage. A probe message is then received from an associated processing device via an associated network. The probe message preferably corresponds to stored multicast address data. Probe identification data associated with the probe message is then tested with the local identification data. Device data, representing a capability of a document processing device, is then selectively communicated to a processing device according to an output of the testing.

In accordance with one example embodiment of the subject application, multicast address data and local address data corresponding to services provided by the first document processing device 104 are stored in the data storage device 110 associated with the first document processing device 104. Similarly, multicast address data and local address data corresponding to services offered by the second document processing device 112 are stored in the associated data storage device 118. The skilled artisan will therefore appreciate that in accordance with one embodiment of the subject application, the data storage devices 110 and 118 are capable of functioning as local UDDI registries. In accordance with one embodiment of the subject application, multicast data and local identification data corresponding to each document processing device 104 and 112 coupled to the computer network 102 are stored in the data storage device 124 associated with the registry server 122. Preferably, the multicast address data corresponds to a multicast address associated with a document processing device 104 or 112, which address the document processing device 104 or 112 monitors for probe messages. The skilled artisan will appreciate that such a use of the registry server 122 and the associated storage 124 enables the registry server 122 to function as a global UDDI registry, a local UDDI registry, or a suitable combination thereof.

A probe message is then received from the processing device 120 via the computer network 102 corresponding to a stored multicast address. Preferably, the probe message includes probe identification data, which represents a UUID corresponding to a selected capability, e.g., service, of the first document processing device 104 or the second document processing device 112. It will be appreciated by those skilled in the art that the local identification data also includes a UUID corresponding to the selected capability associated with the first document processing device 104 or the second document processing device 112. The skilled artisan will understand that the probe identification data and the local identification data also include tModel data representing a tModel associated with the UUID.

For purposes of example only, the first document processing device 104 is the document processing device associated with the multicast address and offering the desired capabilities to the processing device 120. Thus, the first document processing device 104 tests the received probe identification data with the local identification data, i.e., the local identification data associated with the first document processing device 104. The skilled artisan will appreciate that the first document processing device 104, the associated controller 108, or a suitable component associated therewith, analyzes the tModel UUID of the probe message with the tModel UUID's represented by the local identification data stored in the data storage device 110 to determine whether the first document processing device 104 is capable of providing the services designated by the tModel data.

When the first document processing device 104 determines that it is capable of providing the desired service, the first document processing device 104, via the computer network 102, communicates device data representing the capability of the document processing device 104 to the requesting processing device 120. Stated another way, the first document processing device 104, in accordance with testing the received probe message, responds to the processing device 120 with a service endpoint reference, i.e., that the first document processing device 104 is capable of providing the service requested by the processing device 120. In the event that both document processing devices 104 and 112 are associated with the multicast address to which the probe message is sent, both document processing devices 104 and 112 test the probe identification and associated local identification data in accordance with the procedures described above.

In accordance with one example embodiment of the subject application, the processing device 120, first determines whether the UUID corresponding to a desired service is already known, i.e., whether the processing device 120 has stored a multicast address associated with a UUID corresponding to a desired service. When the UUID is not known by the processing device 120, the processing device 120 requests a multicast address from the registry server 122 corresponding to the desired service. A UUID of interest, corresponding to the desired service, is then received from the registry server 122 by the processing device 120 via the computer network 102. The skilled artisan will appreciate that such an embodiment corresponds to the functioning of the registry server 122 as a global UDDI registry. It will be apparent to those skilled in the art that the determination of the UUID is also capable of being accomplished via a local UDDI registry, such as, for example and without limitation, a local UDDI registry resident on the data storage device 110, the data storage device 118, the data storage device 124, or other storage device (not shown) coupled to the computer network 102.

Once the UUID of the desired service is known, the processing device 120 transmits, via the computer network 102, a probe message to the multicast address corresponding to the UUID. The skilled artisan will appreciate that such a probe message suitably includes, for example and without limitation, probe identification data, which represents the UUID corresponding to a desired capability, e.g., service, of a document processing device 104 or 112 communicatively coupled to the computer network 102. The skilled artisan will understand that the probe identification data is also capable of including, for example and without limitation, tModel data representing a tModel associated with the UUID. The processing device 120 then receives, via the computer network 102, a reply to the probe message containing a service endpoint reference, e.g., local identification data corresponding to a document processing device 104 or 112 capable of supplying the desired service. The processing device 120 is then capable of requesting the identified document processing device 104 or 112 to perform the desired service.

Figure 6:
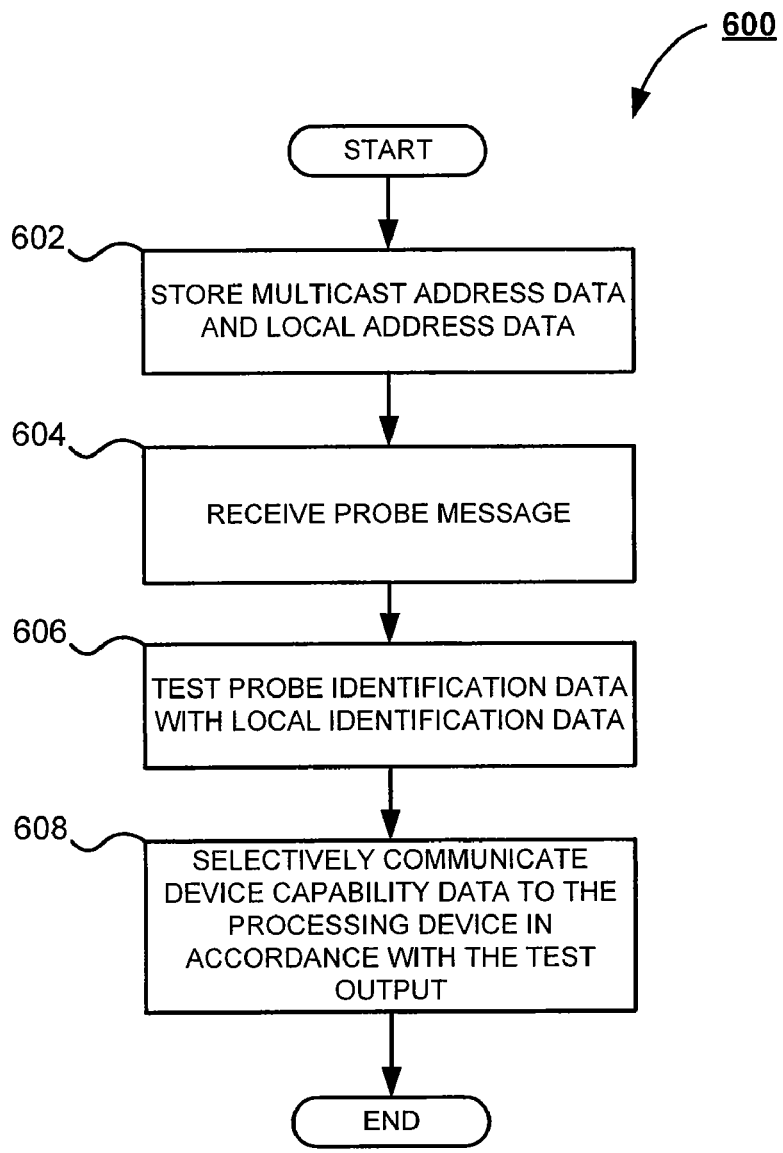
FIG. 6 is a flowchart illustrating a network document processing device discovery method according to the subject application.

The skilled artisan will appreciate that the subject system 100 and components described above with respect to FIG. 1, FIG. 2, FIG. 3, FIG. 4, and FIG. 5 will be better understood in conjunction with the methodologies described hereinafter with respect to FIG. 6 and FIG. 7. Turning now to FIG. 6, there is shown a flowchart 600 illustrating a network document processing device discovery method in accordance with the subject application. Beginning at step 602, multicast address data and local address data are stored in a suitable storage. In accordance with one embodiment of the subject application, the local address data includes, for example and without limitation, data representing a tModel associated with a UUID corresponding to a selected capability of a document processing device. At step 604, a probe message is received from an associated processing device 120, via an associated computer network 102. In accordance with one embodiment of the subject application, the probe message corresponds to stored multicast address data.

At step 606, probe identification data is tested with local identification data. Device capability data is then selectively communicated to the processing device 120 in accordance with the output of the test of the probe identification data with the local identification data. In accordance with one embodiment, the test results indicating the communication of device data to the processing device are indicative of a match between the probe identification data and the local identification data in the storage. That is, the document processing device 104 or 112 compares the probe identification data, indicating a tModel associated with a UUID with local identification data stored in the data storage device 110 or 118 to determine if a match is present. When a match is present, the document processing device 104 or 112 returns device capability data to the requesting processing device 120.

Figure 7:
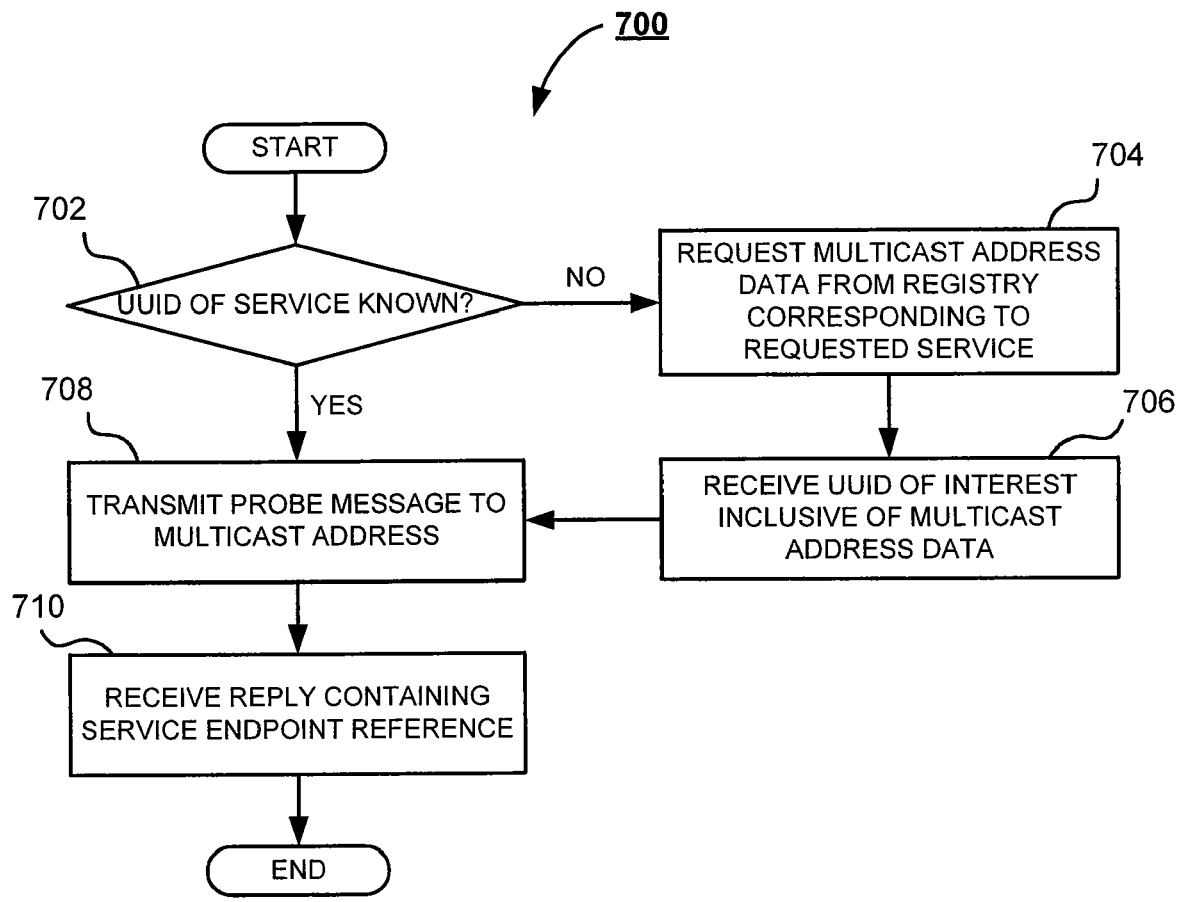
FIG. 7 is a flowchart illustrating a network document processing device discovery method according to the subject application.

Referring now to FIG. 7, there is shown a flowchart 700 illustrating a network document processing device discovery method in accordance with the subject application. The skilled artisan will appreciate that the flowchart 700 of FIG. 7 is an example embodiment of the subject application from the point-of-view of the processing device 120. It will be understood by those skilled in the art that while the processing device 120 is illustrated as a personal computer communicatively coupled to the computer network 102, either document processing device 104 or 112 is also capable of functioning as a processing device in accordance with the methodology described in FIG. 7. At step 702, the processing device 120 determines whether the UUID of the desired service is known. That is, the processing device 120 determines whether or not the device 120 knows the multicast address to which to send a probe message when searching for a suitable document processing device.

When the UUID is not known, flow proceeds to step 704, whereupon the processing device 120 requests multicast address data from the registry server 122 corresponding to the desired service. The registry server 122 then searches the data storage device 124 for a UUID and multicast address data matching the service requested by the processing device 120. The processing device 120 then receives the UUID of interest, inclusive of an associated multicast address, from the registry server 122 at step 706. Thereafter, operations progress to step 708, as explained in greater detail below.

Returning to step 702, when it is determined that the UUID of the desired service is known, flow progresses to step 708, whereupon the processing device 120 transmits a probe message to the multicast address associated with the desired service via the computer network 102. In accordance with the subject application, the probe message includes identification data inclusive of a tModel associated with the UUID corresponding to the selected capability of a document processing device, i.e., the desired service. At step 710, the processing device 120 then receives a reply containing a service endpoint reference in response to the sent probe message. That is, the processing device 120 receives identification information corresponding to the identity of a document processing device 104 or 112 on the computer network 102 capable of providing the desired service.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A network document processing device discovery system comprising:
   storage means adapted for storing multicast address data and local identification data;
   means adapted for receiving, from an associated network, a probe message from an associated processing device, which probe message corresponds to stored multicast address data;
   testing means adapted for testing probe identification data associated with the probe message with the local identification data; and
   means adapted for selectively communicating device data representative of a capability of a document processing device to the associated processing device in accordance with an output of the testing means, wherein the device data includes data representative of a match of the probe message and the data disposed in the storage means.

2. The network document processing device discovery system of claim 1 wherein probe identification data and local identification data include a UUID corresponding to a selected capability of the document processing device.

3. The network document processing device discovery system of claim 2 wherein probe identification data and the local identification data further include tModel data representative of a tModel associated with a the UUID.

4. The network document processing device discovery system of claim 3 wherein the tModel data is obtained from a local UDDI registry.

5. The network document processing device discovery system of claim 4 wherein the tModel data is obtained from a global UDDI registry.

6. A network document processing device discovery method comprising the steps of:
   storing multicast address data and local identification data in an associated storage;
   receiving, from an associated network, a probe message from an associated processing device, which probe message corresponds to stored multicast address data;
   testing probe identification data associated with the probe message with the local identification data; and
   selectively communicating device data representative of a capability of a document processing device to the associated processing device in accordance with an output of the testing, wherein the device data includes data representative of a match of the probe message and data disposed in the storage.

7. The network document processing device discovery method of claim 6 wherein probe identification data and local identification data include a UUID corresponding to a selected capability of the document processing device.

8. The network document processing device discovery method of claim 7 wherein probe identification data and the local identification data further include tModel data representative of a tModel associated with a the UUID.

9. The network document processing device discovery method of claim 8 wherein the tModel data is obtained from a local UDDI registry.

10. The network document processing device discovery method of claim 9 wherein the tModel data is obtained from a global UDDI registry.

11. A computer-implemented method for network document processing device discovery comprising the steps of:
    storing multicast address data and local identification data in an associated storage;
    receiving, from an associated network, a probe message from an associated processing device, which probe message corresponds to stored multicast address data;
    testing probe identification data associated with the probe message with the local identification data; and
    selectively communicating device data representative of a capability of a document processing device to the associated processing device in accordance with an output of the testing, wherein the device data includes data representative of a match of the probe message and data disposed in the storage.

12. The computer-implemented method for network document processing device discovery of claim 11 wherein probe identification data and local identification data include a UUID corresponding to a selected capability of the document processing device.

13. The computer-implemented method for network document processing device discovery of claim 12 wherein probe identification data and the local identification data further include tModel data representative of a tModel associated with a the UUID.

14. The computer-implemented method for network document processing device discovery of claim 13 wherein the tModel data is obtained from a local UDDI registry.

15. The computer-implemented method for network document processing device discovery of claim 14 wherein the tModel data is obtained from a global UDDI registry.

* * * * *

UNITED STATES PATENT AND TRADEMARK OFFICE
CERTIFICATE OF CORRECTION

PATENT NO.       : 7,752,305 B2
APPLICATION NO.  : 11/626823
DATED            : July 6, 2010
INVENTOR(S)      : Fabio Gava, Andrey Savov and Silvy Wilson It is certified that error appears in the above-identified patent and that said Letters Patent is hereby corrected as shown below:

In column 13, lines 64-67 (claim 3), please replace the claim as followed:

--The network document processing device discovery system of claim 2 wherein probe identification data and the local identification data further include tModel data representative of a tModel associated with the UUID.--

In column 14, lines 25-28 (claim 8), please replace the claim as followed:

--The network document processing device discovery method of claim 7 wherein probe identification data and the local identification data further include tModel data representative of a tModel associated with the UUID.--

In column 14, lines 35-37 (claim 11), please replace as followed:

--A computer-implemented method for network document processing device discovery comprising the steps of:--

In column 14, lines 56-59 (claim 13), please replace the claim as followed:

--The computer-implemented method for network document processing device discovery of claim 12 wherein probe identification data and the local identification data further include tModel data representative of a tModel associated with the UUID.--

Signed and Sealed this

Thirty-first Day of August, 2010

David J. Kappos
*Director of the United States Patent and Trademark Office*